UNITED STATES PATENT OFFICE.

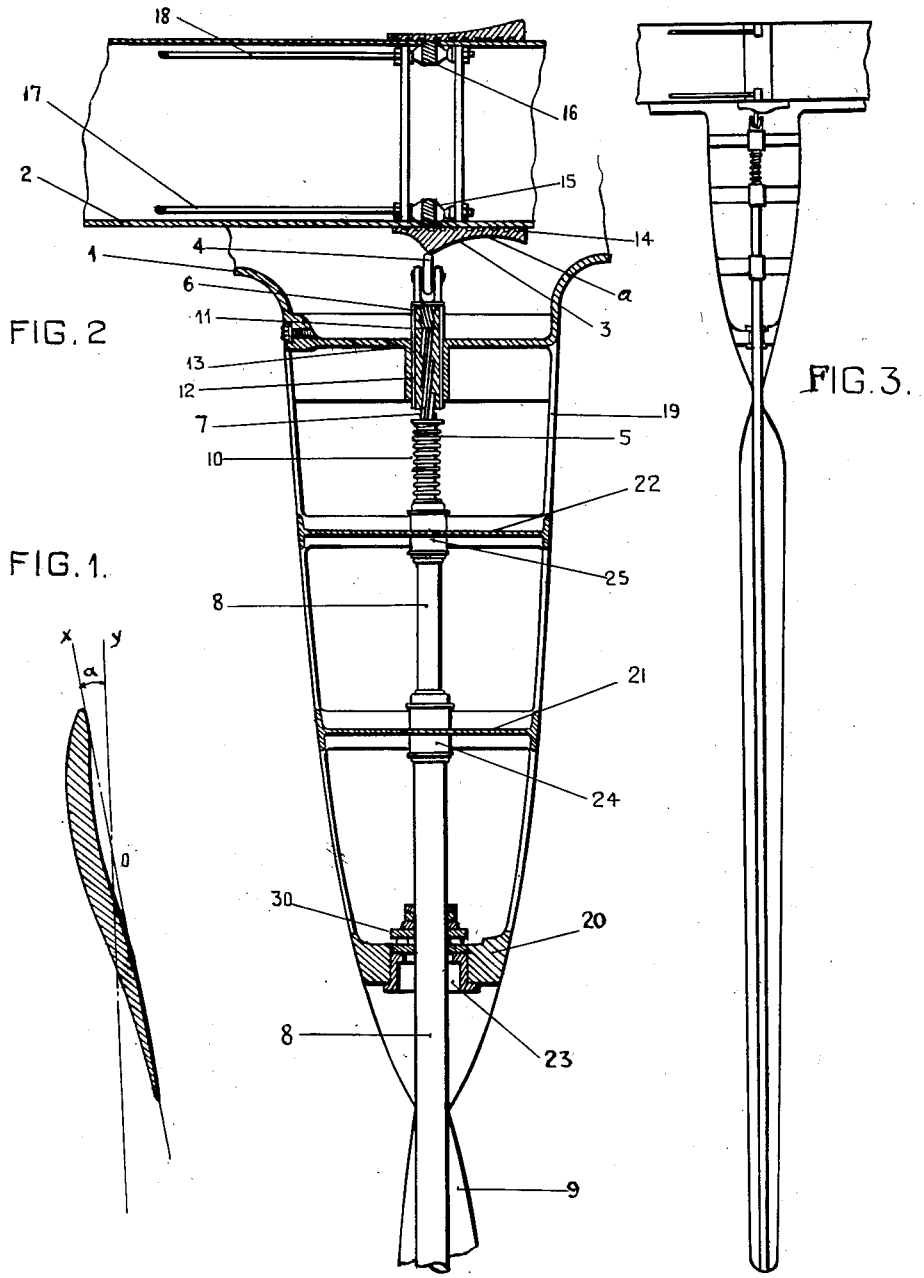

RAUL PATERAS PESCARA, OF BARCELONA, SPAIN.

SYSTEM OF PROPELLERS OF VARIABLE INCIDENCE AND DIFFERENTIAL MOTION FOR HELICOPTERAL MACHINES.

1,403,624.      Specification of Letters Patent.    Patented Jan. 17, 1922.

Application filed November 14, 1919. Serial No. 337,916.

*To all whom it may concern:*

Be it known that I, RAUL PATERAS PESCARA, citizen of Republic Argentine, residing at Barcelona, in the county of Barcelona and State of Spain, have invented certain new and useful Improvements in a System of Propellers of Variable Incidence and Differential Motion for Helicopteral Machines, and do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to propellers for aircraft, particularly aircraft of the helicopteral type.

An object of the invention is to provide a propeller of variable incidence in which the angle of incidence of the blades may be varied during flight.

A further object of the invention is to provide a propeller in which the incidence of the blades may be varied in every revolution of the propeller which will support the airplane structure in the air, as well as propel it in a desired direction through the air.

Another object of the invention is to construct the propeller with means for controlling and adjusting the variation of the angle of incidence.

The variation of the incidence of the propellers of a helicopteral machine will produce a maximum and a minimum incidence at diametrically opposite points. A greater pressure will be created upon the air at the point of maximum incidence and the machine will therefore be driven in the direction of the point of minimum incidence.

The propeller blades are mounted on shafts rotatably mounted in a housing, the shafts having their inner ends threaded to receive threaded sleeve members which are slidably mounted in the housing. One end of each sleeve member carries a roller adapted to engage a cam member mounted on the axle supporting the propeller. This cam member moves the sleeves in line with the axes of the shafts, on which they are mounted, and in this axial movement produces a rotative movement of the shafts and blades and thereby varies the incidence of the blades.

The objects and details of construction are more particularly pointed out in the following description and claims:

In the drawings:—

Fig. 1 is a cross section of a propeller blade.

Fig. 2 is a sectional view of a portion of the housing in which the blade is mounted.

Fig. 3 is a view showing a whole blade with its housing section.

In order to clearly illustrate what is meant by incidence, a cross section of a blade is shown in Fig. 1, in which OX indicates the cord of an arch formed by the profile of the section, OY the plane of rotation of the blade, and $a$ the angle of incidence of the section; consequently by causing the blade to turn on its longitudinal axis, the angle of incidence will vary in the same amount throughout all the sections of the blade.

1 indicates a hollow axle which is mounted in the body of the machine (not shown), usually in a vertical plane, and has a cam 2 slidably mounted on the outside thereof. The cam is provided with screw threads 3 on the inner periphery thereof, which are engaged by pinions 4 mounted on rods 5 rotatably mounted on the inside of the axle member, the pinions extending through slots 6 formed in the axle member. The rods extend to a control terminal adjacent the operator of the machine, so that the cam is easily operated from the driver's seat.

A sleeve 7 is rotatably mounted over the axle 1 and is connected with the prime mover (not shown) for receiving power for driving the propeller blades carried thereby.

The sleeve carries the housings 8 in which the blades 9 are rotatably mounted on shafts 10. As the shaft and housing construction are identical for each blade, only the construction of one is shown and described. The housing is formed with transverse webs 11, 12 and 13 in which are mounted bearings 14, the shaft 10 being mounted in the bearings in webs 12 and 13, and having a reduced extension 15 provided with threads 16 engaging with the threaded sleeve 17 slidably mounted in web 11.

The sleeve 17 is provided with ribs 18 to prevent it from rotating, the ribs sliding in grooves formed in web 11. One end of the sleeve is closed and has a roller 19 mounted thereon, adapted to engage the surface of cam 2. A spring 20 is interposed between the sleeve and web 12 for keeping roller 19 in engagement with the surface of the cam.

The end of the housing is provided with a main bearing indicated at 21.

In operation rotative motion from the engine is imparted to the sleeve 7 for driving the propeller. As the propeller rotates on the axle 1, the rollers on the sleeves 17 will ride over the surface of the cam and the sleeves will be moved in line with their axes according to the eccentricity of the cam. As the sleeves move in an axial line, the shafts 10 will be rotated thereby, due to the threaded engagement of the sleeves with the extensions 15 on the shafts, in an obvious manner. This rotation of the shafts 10 will vary the incidence of the blades, the incidence in certain of the blades diminishing, while in others it is increasing.

It will be obvious that the incidence of each blade will be varied in every revolution thereof in proportion to the eccentricity of the cam through the sliding of the sleeve member.

It is also to be noted that the difference between the maximum and the minimum variations may be increased to a certain limit or decreased to zero, by adjusting the cam on the axle, which may be done by the operator, by turning the rods 5.

Having now described and ascertained the nature of my invention,

1. A propeller for helicopteral aircraft comprising an axle, a cam movably mounted thereon, a housing rotatably mounted on the axle, propeller blades rotatably mounted in the housing and means operated by the cam slidably mounted in the housing and connected with the blades, whereby the incidence of the blades for axial movement therewith is varied in every revolution of the propeller, the cam remaining in one position.

2. A propeller for helicopteral aircraft comprising an axle, a housing rotatably mounted on the axle, blades rotatably mounted in the housing, members slidably mounted in the housing and engaging the end of the blades in the housing, a cam movably mounted on the axle and engaged by the member, and having an irregular surface whereby the cam may be moved so as to produce a different sliding movement of the members at each point of the circumference of the cam surface engaged by the members which sliding movement will cause a relative rotation of each blade and thereby vary the incidence of the blades in every revolution of the propeller.

3. A propeller for helicopteral aircraft comprising an axle, a cam movably mounted thereon and having an irregular concentric surface, a housing rotatably mounted on the axle, shafts rotatably mounted in the housing, blades mounted on the shaft, said shafts having the inner end portions threaded, members slidably mounted in the housing and engaging the threaded ends of the shafts and the cam, and springs for holding the members in engagement with the cam.

4. A propeller for helicopteral aircraft comprising an axle, a cam movably mounted thereon, means for moving the cam, a housing rotatably mounted on the axle, propeller blades rotatably mounted in the housing and having the inner ends screw-threaded, members slidably mounted in the housing and engaging the threaded ends of the blades, rollers carried by said members adapted to engage the periphery of the cam and springs for normally forcing the rollers into engagement with the cam whereby the cam is adapted to rotate the blades through the members to vary the incidence thereof in every revolution of the propeller.

5. A propeller for helicopteral aircraft comprising an axle, propeller blades mounted for rotation about said axle and adapted to rotate on their axes, members mounted for sliding movement and engaging the blades, so as to produce a rotative movement thereof during the sliding movement of said members, and means for regulating the sliding movement of the members whereby the blades may be rotated on their axes in every revolution about the axle to vary the incidence thereof.

In testimony whereof I have signed my name to this specification in the presence of two subscribing witnesses.

RAUL PATERAS PESCARA.

Witnesses:
 EL CONDE BAQUER DE RETAMOSA,
 FRANC PEREZ.